April 18, 1967  W. K. GULICK  3,314,335
ACTUATOR LOCKING MECHANISM
Filed May 6, 1965
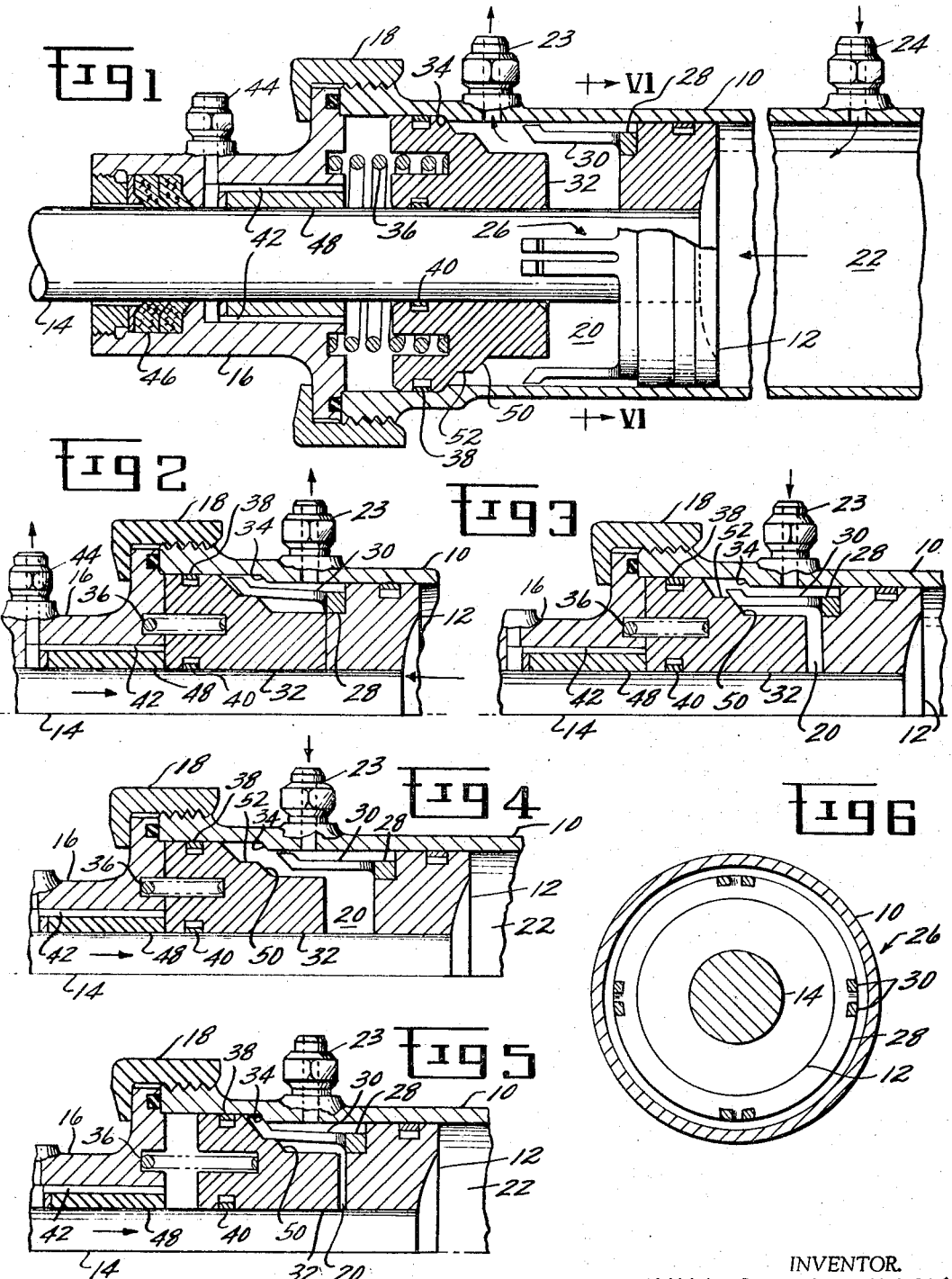
INVENTOR.
WILLIAM K. GULICK
BY
ATTORNEY

United States Patent Office 3,314,335
Patented Apr. 18, 1967

3,314,335
ACTUATOR LOCKING MECHANISM
William K. Gulick, Cincinnati, Ohio, assignor to General Electric Company, a corporation of New York
Filed May 6, 1965, Ser. No. 453,794
4 Claims. (Cl. 92—26)

The present invention relates to improvements in actuators of the type comprising a cylinder and a piston reciprocable therein and more particularly to improve means for locking such actuators in a given position in the event of a failure in the delivery of pressurized actuating fluid thereto.

There are many situations where it is desired to provide mechanical means for positively locking an actuator in a given position, usually in one extreme of movement or another, in the event of a power failure, particularly a failure in the delivery of actuating fluid. Many schemes have been devised for obtaining this end, but for the most part they are either unduly complex, require a separate actuation means, or involve excessive wear of the components so that the life of the actuator itself is shortened or frequent servicing is necessitated.

The object of the present invention is to provide an improved actuator locking mechanism which is simple in design and economical to manufacture and which will have a long operating life.

To these ends the present inventive concepts involve provision of novel locking means in an actuator of the type comprising a cylinder having a piston reciprocable with a piston rod extending from at least one end of the cylinder. The piston separates the cylinder into chambers on opposite sides thereof, and a plurality of locking fingers project from the piston into one of these chambers. The fingers are normally disposed inwardly of the inner wall of the cylinder as the piston reciprocates.

A locking actuator is mounted adjacent the end of the one chamber and spring biased towards a locking shoulder with which the fingers are engageable. The inner diameter of the cylinder at the end where the lock actuator is mounted is preferably slightly enlarged from the diameter in which the piston rides to thus form locking shoulder adjacent the extreme of piston movement in the one chamber. As the piston is displaced toward the lock actuator it is displaced away from the locking shoulder and the spring fingers are flexed into alignment with the locking ledge. Assuming normal operation, fluid pressure is introduced into this one chamber, maintaining the lock actuator in spaced relation from the locking shoulder, permitting the fingers to spring inwardly and ride free and clear of the inner diameter of the cylinder without any extensive wear thereon. This is to say that in normal operation the locking mechanism is ineffective. However, assuming that the piston has been displaced to this extreme position and there is then a failure of the actuating fluid pressure, the lock actuator will be maintained in a position where the locking fingers are aligned with the locking shoulder and the piston will therefore be locked in this extreme position against forces exerted on the piston rod.

The above and other related objects and features of the invention will be apparent from a reading of the following description of the disclosure found in the accompanying drawing and the novelty thereof pointed out in the appended claims.

In the drawing:

FIG. 1 is a longitudinal section of a portion of an actuator embodying the present invention locking mechanism:

FIGS. 2, 3, 4, and 5 are fragmentary, longitudinal sections of this actuator, illustrating the operation of the locking mechanism; and FIG. 6 is a section taken on line VI—VI in FIG. 1.

FIG. 1 illustrates one end of an actuator embodying the present locking mechanism. The actuator comprises a cylinder 10 within which a piston 12 is reciprocable. A piston rod 14 connected to the piston 12 extends through an end cap 16 which is secured to the cylinder 10 by a retaining ring 18. The piston 12 defines chambers 20 and 22 on opposite sides thereof. Pressurized fluid is alternately introduced into and discharged from the chambers 20 and 22 through port fittings 23, 24 respectively, fluid flow being controlled by appropriate valve means to recoprocate the piston 12 and the rod 14 which would be connected through whatever device is displaced by the actuator.

The present locking mechanism comprises a locking member 26 having a ring shaped base 28 secured as by brazing to one side of the piston 12. A plurality of locking fingers 30 project from the base 28 into the chamber 20. The fingers 30 are shown in pairs which is a matter of manufacturing convenience. A lock actuator 32 is telescoped over the piston rod 14 and defines the left-hand end of the chamber 20. It will be noted that the extreme left-hand end of the cylinder 10 is formed with an enlarged bore which is joined with the piston at a locking shoulder 34 to conveniently provide a stop for limiting movement of the lock actuator 32 as it is urged outwardly by a spring 36 captured between the lock actuator and the end cap 16.

In many actuators employed under high performance conditions it is essential that an utmost minimum of hydraulic fluid escape or leak between the output piston and the cylinder. To this end it is known to provide a primary seal which maintains the fluid pressure within the cylinder and a secondary seal which actually functions to effectively prevent leakage. A drain line is provided between these two seals so that leakage from the primary seal may be returned to the hydraulic system. Thus, there is a very substantial pressure drop across the primary seal but a minimum pressure drop across the secondary seal so that the secondary seal may effectively prevent leakage of the hydraulic fluid from the system itself.

In the present instance, the lock actuator 32 carries the primary sealing means referred to. Thus it will be seen that a sealing ring 38 provides a seal between the lock actuator and the inner wall of the cylinder 10, while seal 40 provides a seal between the lock actuator 32 and rod 14. Thus there is a substantial pressure drop across opposite sides of the lock actuator, and the actual fluid pressure on the left-hand end of the lock actuator 32 would be very small or negligible. Any leakage of hydraulic fluid past the seals 38 and 40 is carried through holes 42 in the end cap 16 to a port fitting 44 which is connected by appropriate conduits to the sump of the oil pump. Packings 46 provide a secondary seal across which there is a minimum pressure drop and which effectively prevents leakage of the hydraulic fluid from the system itself. The piston rod 14 is appropriately journaled in a bearing 48 which in the present embodiment does not serve any sealing function.

In normal operation of the present actuator the piston 12 reciprocates back and forth within the cylinder 10 as the chambers 20 and 22 may be alternately pressurized. In many instances the actuator will be employed to move an element to an extreme position wherein the piston 12 is likewise displaced to an extreme position, as indicated in FIG. 2. As the piston 12 is displaced from the position shown in FIG. 1 to the position shown in FIG. 2, the locking fingers 30 first displace the lock actuator 32 against the action of spring 36, and then are cammed outwardly by the conical surface 50 thereon to a point where they are resting on a diametrical ledge 52. It will be noted that as the piston 12 moves to the extreme position shown in FIG. 2, the right-hand end of the lock actuator 32 engages the adjacent surface of the piston 12 to limit relative movement therebetween. The fingers 30 thus neither absorb any substantial compressive load, nor engage the inner wall of the cylinder 10 in normal operation. It will also be noted that the end cap 16 and lock actuator 32 are recessed to receive the spring 36 so that the force on the piston resulting from pressurization of chamber 22 is transmitted directly to the end cap through the lock actuator.

After arriving at an extreme position as shown in FIG. 2, the piston 12 may be maintained in that position or retracted by the introduction of pressurized hydraulic fluid through the port 23. When the latter occurs, fluid pressure effective upon the lock actuator 32 maintains it in its extreme position spaced from the locking shoulder 34. The locking fingers 30 are thereby able to ride down the conical surface 50 (FIG. 3) and return to their normal positions spaced from the inner wall of the cylinder 10 as the piston 12 reciprocates toward the right, as indicated in FIG. 4.

It will thus be apparent that the actuator may be reciprocated in normal fashion without and significant wear on the locking unit itself or on any surface which must cooperate in a sealing function. However, assuming that the actuator is in the position illustrated in FIG. 2, and at this point there is a failure in the hydraulic pressurization system so that there is little or no pressure in either of the chambers 20 or 22, and assuming further a force on the piston rod 14 tending to displace it toward the right, it will be seen that the spring 36 maintains the locking fingers 30 in their outwardly flexed position so that after a short travel toward the right, the outbent ends of locking fingers 30 engage the locking shoulder 34, and thereby prevent further displacement of the piston until the hydraulic pressurization system has been restored. When repressurization of chamber 20 occurs, the locking mechanism will automatically unlatch, as the lock actuator 32 is displaced toward the left against the action of spring 36. The locking fingers 30 are then able to snap past the locking shoulder 34, and the actuator may be returned to its normal operation.

The described arrangement is facilitated by the fact that there is little or no fluid pressure on the spring side of the lock actuator 32. That is, no fluid and particularly liquid fluid can be trapped therebehind, because of the provision of a drain or bleed system as previously described. However, where such a drain system may not be necessary or desirable, appropriate check valve means can be provided in the lock actuator 32 to prevent trapping of liquid which would inhibit movement of the lock actuator. It will also be apparent the broader concepts of the invention, as defined in the following claims, are equally applicable to both pneumatically and hydraulically driven actuators.

Having thus described the invention, what is claimed as novel and desired to be secured by Letters Patent of the United States is:

1. Locking mechanism for an actuator comprising,
    a cylinder and a piston reciprocable in a bore therein,
    said piston dividing the interior of said cylinder into chambers of variable volume on opposite sides thereof,
    a port for the alternate introduction and discharge of actuating fluid into and from one of said chambers,
    said locking mechanism comprising,
    a plurality of locking fingers projecting from said piston into said one chamber and normally spaced from the piston bore,
    a locking shoulder,
    a lock actuator reciprocable at the opposite end of said one chamber and displaced from said locking shoulder when said one chamber is pressurized,
    spring means urging the lock actuator toward said locking shoulder,
    said lock actuator having a camming surface engageable by said locking fingers for displacement of said lock actuator while said locking fingers are spaced from said bore as the piston moves towards one end of said cylinder,
    said lock actuator having a camming surface flexing said fingers into alignment with said locking shoulder, only when said lock actuator is displaced to the end of said one chamber,
    whereby the piston will be locked at said one end of the cylinder by engagement of the fingers with the locking shoulder if said one chamber is not pressurized, and if said one chamber is pressurized, the lock actuator is maintained in spaced relation from said locking shoulder, permitting the locking fingers to return to their normal position clear of the locking shoulder.

2. Locking mechanism for an actuator comprising,
    a cylinder and a piston reciprocable in a bore therein,
    said piston dividing the interior of said cylinder into chambers of variable volume on opposite sides thereof,
    a port for the alternate introduction and discharge of actuating fluid into and from one of said chambers,
    said locking mechanism comprising,
    a plurality of locking fingers projecting from said piston into said one chamber and normally spaced from the piston bore,
    said cylinder having an enlarged bore at one end and a locking shoulder joining this bore with the piston bore,
    a lock actuator reciprocable in said enlarged bore,
    said lock actuator being displaced from said locking shoulder when said one chamber is pressurized,
    spring means urging the lock actuator toward said locking shoulder,
    said lock actuator having a camming surface engageable by said locking fingers for displacement of said lock actuator while said locking fingers are spaced from said bore as the piston moves towards one end of said cylinder,
    said locking fingers having outbent ends and said lock actuator having a camming surface flexing said fingers outwardly to bring said outbent ends into alignment with said locking shoulder, only when said lock actuator is displaced to the end of said one chamber,
    whereby the piston will be locked at said one end of the cylinder by engagement of the outbent ends of the fingers with the locking shoulder if said one chamber is not pressurized and if said one chamber is pressurized, the lock actuator is maintained in spaced relation from said locking shoulder, permitting the locking fingers to return to their normal position, spaced from the piston bore of the cylinder.

3. Locking mechanism for an actuator comprising,
    a cylinder and a piston reciprocable in a bore therein,
    said piston dividing the interior of said cylinder into chambers of variable volume on opposite sides thereof,
    a port for the alternate introduction and discharge of actuating fluid into and from one of said chambers,
    said locking mechanism comprising,
    a plurality of locking fingers projecting from said piston into said one chamber,
    said cylinder having an enlarged bore at one end and a locking shoulder joining this bore with the piston bore,
    a lock actuator reciprocable in said enlarged bore,
    said lock actuator being displaced from said locking shoulder when said one chamber is pressurized,
    a compression spring urging the lock actuator into engagement with said locking shoulder, recess means permitting the lock actuator to be bottomed against the end of the cylinder, sealing means carried by said lock actuator to provide the primary seal for maintaining pressure in said one chamber, passageway means for conveying from said actuator any actuating fluid leaking past said sealing means, said locking fingers normally being spaced from the piston bore and engageable with said lock actuator to displace it from said locking shoulder as the piston moves towards said one end of the cylinder, said locking fingers having outbent ends and said lock actuator having a camming surface flexing said fingers outwardly to bring said outbent ends into alignment with said locking shoulder, after the lock actuator has been so displaced by piston movement.

coacting abutment means on said piston and lock actuator for transmitting piston force, resulting from pressurization of the other chamber, through the lock actuator to said one end of the cylinder, and limiting relative movement therebetween to prevent engagement of the fingers with said enlarged bore, whereby the piston will be locked at said one end of the cylinder by engagement of the outbent ends of the fingers with the locking shoulder if said one chamber is not pressurized, and if said one chamber is pressurized, the lock actuator is maintained in spaced relation from said locking shoulder, permitting the locking fingers to return to their normal position spaced from the piston bore of the cylinder.

4. Locking mechanism for an actuator comprising, a cylinder and a piston reciprocable in a bore therein, said piston dividing the interior of said cylinder into chambers of variable volume on opposite sides thereof, a port for the alternate introduction and discharge of actuating fluid into and from one of said chambers, said locking mechanism comprising, a plurality of locking fingers projecting from said piston into said one chamber, said cylinder having an enlarged bore at said one end and a tapered locking shoulder joining this bore with the piston bore, a lock actuator, said lock actuator being displaced from said locking shoulder when said one chamber is pressurized, a compression spring urging the lock actuator into engagement with said locking shoulder, recess means permitting the lock actuator to be bottomed against the end of the cylinder, seals between said lock actuator and said enlarged bore and between said lock actuator and said rod to provide the primary seal for maintaining pressure in said one chamber, passageway means for conveying from said actuator any actuating fluid leaking past said seals, said locking fingers normally being spaced from the piston bore and engageable with said lock actuator to displace it from said locking shoulder as the piston moves toward said one end of the cylinder, said locking fingers having outbent ends and said lock actuator having a camming surface flexing said fingers outwardly to bring said outbent ends into alignment with said locking shoulder after the lock actuator has been so displaced by piston movement, said lock actuator having ledge surfaces supporting the fingers in flexed condition, said outbent portions of said fingers having a taper corresponding to that of the locking shoulder, coacting abutment means on said piston and lock actuator for transmitting piston force, resulting from pressurization of the other chamber, through the lock actuator to said one end of the cylinder and limiting relative movement therebetween to prevent engagement of the fingers with said enlarged bore, whereby the piston will be locked at said one end of the cylinder by engagement of the outbent ends of the fingers with the locking shoulder if said one chamber is not pressurized and if said one chamber is pressurized, the lock actuator is maintained in spaced relation from said locking shoulder permitting the locking fingers to return to their normal positions spaced from the piston bore of the cylinder.

References Cited by the Examiner

UNITED STATES PATENTS

| 2,297,902 | 10/1942 | Levy | 92—26 |
| 2,568,561 | 9/1951 | Perdue et al. | 92—26 |
| 2,685,275 | 8/1954 | Caldwell | 92—26 |
| 2,851,995 | 9/1958 | Westcatt | 92—26 |

References Cited by the Applicant

UNITED STATES PATENTS

| 1,665,985 | 4/1928 | Scott. |
| 2,769,430 | 11/1956 | Geyer. |
| 2,887,991 | 5/1959 | Driskel et al. |
| 2,967,512 | 1/1961 | Born. |
| 2,970,573 | 2/1961 | Geyer. |

MARTIN P. SCHWADRON, *Primary Examiner.*